Aug. 13, 1957 J. V. HALVORSEN ET AL 2,802,705
ROLLER BEARING JOURNAL BOX
Filed Dec. 29, 1954 3 Sheets-Sheet 3

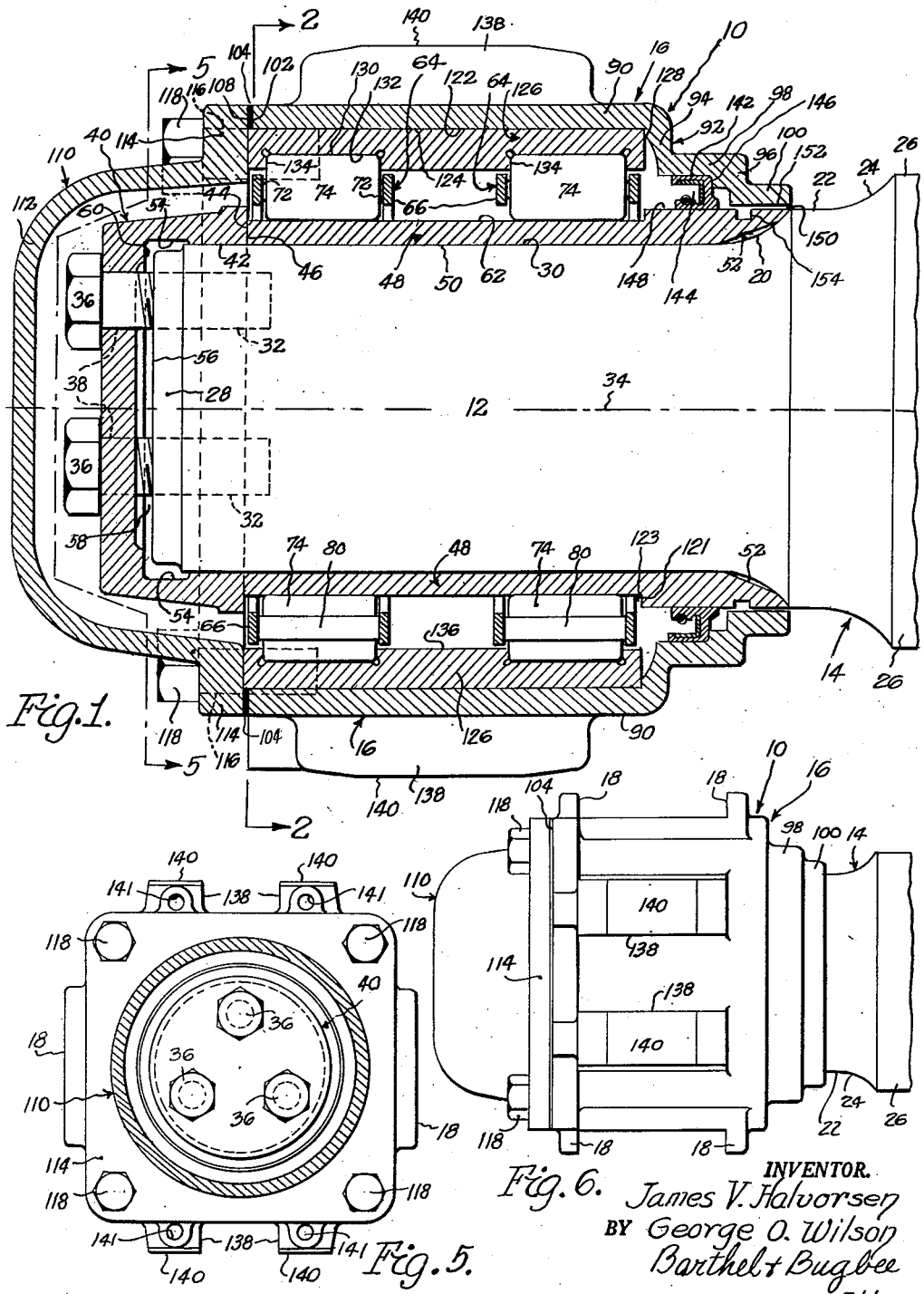

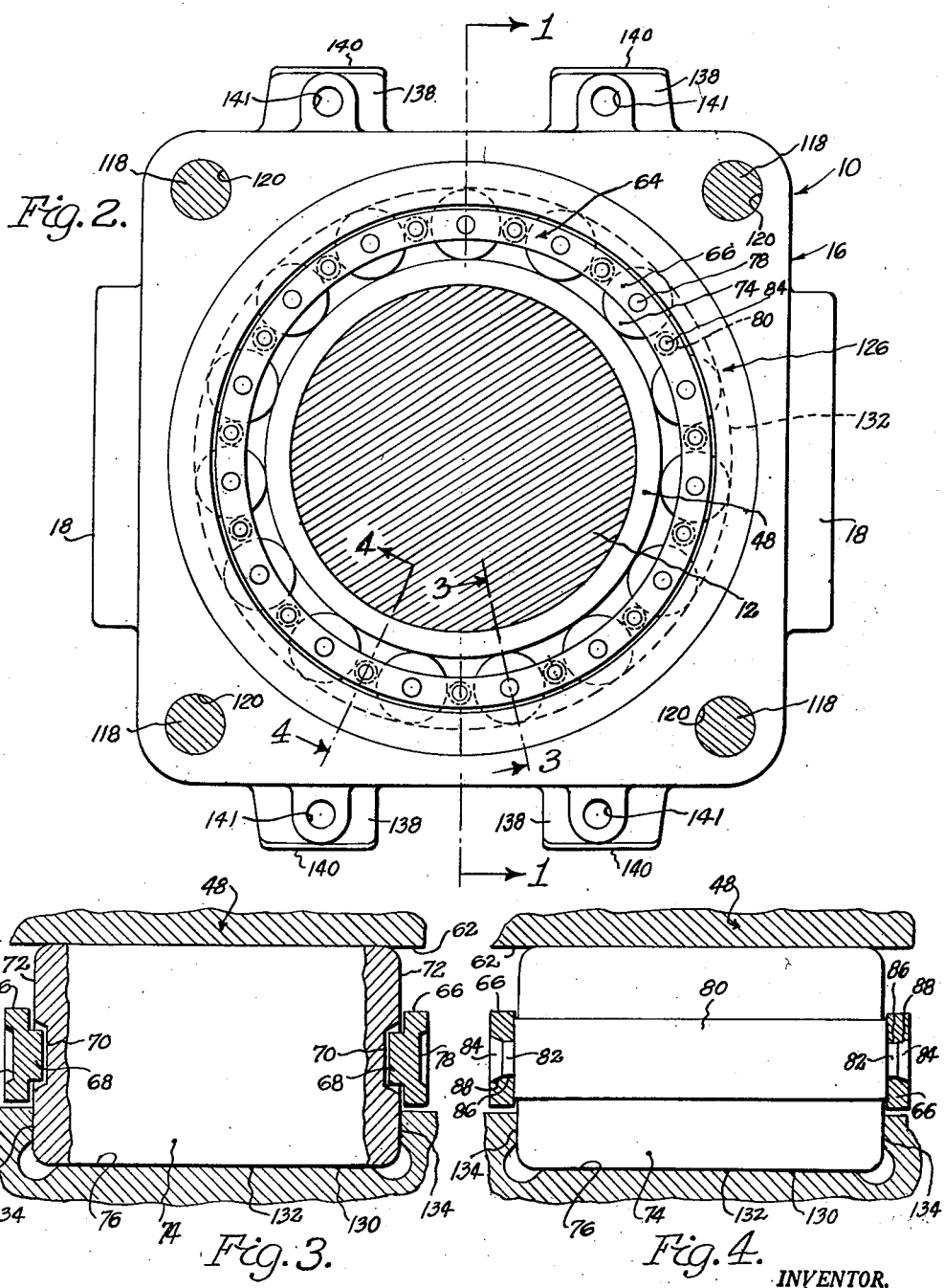

INVENTOR.
James V. Halvorsen
BY George O. Wilson
Barthel + Bugbee
Attys

United States Patent Office 2,802,705
Patented Aug. 13, 1957

2,802,705

ROLLER BEARING JOURNAL BOX

James V. Halvorsen and George O. Wilson, Detroit, Mich., assignors, by mesne assignments, to Federal-Mogul-Bower Bearings, Inc., Detroit, Mich., a corporation of Michigan Application December 29, 1954, Serial No. 478,302

5 Claims. (Cl. 308—180)

This invention relates to anti-friction bearing units and, in particular, to such units for railway car axles.

One object of this invention is to provide a roller bearing journal box for railway car axles which fits into standard pedestal-type truck side frames which are interchangeable with the standard integral side frames of the trucks of railway cars, especially freight cars, so as to enable their rapid conversion from plain bearings to roller bearings at a low cost.

Another object is to provide a railway car axle roller bearing journal box of the foregoing character equipped with a one-piece outer race which is separate from the housing, so as to enable the replacement of a worn, defective or broken outer race without necessitating replacement of the housing, as well as reducing the maintenance costs of such bearings.

Another object is to provide a railway car axle roller bearing journal box of the foregoing character which can be installed and removed from the outer end of the axle without requiring access to the inner end of the housing thereof, thereby simplifying such operations, and reducing the time and labor costs thereof.

Another object is to provide a railway car axle roller bearing journal box of the foregoing character having an outer race and roller assembly which, when once assembled, is incapable of accidental disassembly or of individual rollers dropping out accidentally during removal of the journal box from the axle whereby to enable insertion and withdrawal of said assembly as a unit.

Another object is to provide a railway car axle roller bearing journal box of the foregoing character wherein the housing is symmetrical and therefore reversible by being movable through 180°, so as to present a new set of pads to the side frame mount and also to present a new wear surface on the bearing cup or outer race.

Another object is to provide a railway car axle roller bearing journal box of the foregoing character wherein a desired amount of limited end play is permitted to prevent the wheels from jumping track, and wherein any end thrust on the bearing is transmitted from the inner race on the axle diagonally through the rollers directly to a shoulder on the outer race and thence to a thrust member located outside the journal box, thereby eliminating the need for an auxiliary or separate thrust bearing.

Another object is to provide a railway car axle roller bearing journal box of the foregoing character wherein the side wall and inner end of the housing are of integral construction closed at the inner end around the axle so as to permit access only from the outer end and requiring closure only at the outer end, thereby eliminating an inner end cap with its bolts and simplifying assembly and mounting in the railway car truck.

Another object is to provide a railway car axle roller bearing journal box of the foregoing character which is provided with an annular seal and a pair of axially-spaced roller bearing assemblies so constructed and arranged that in sliding the journal box onto the inner race on the axle, the two roller bearing assemblies reach and engage their respective surface on the inner race before the seal reaches and engages its respective surface on the inner race, thereby piloting the seal onto its inner race surface and thus preventing damage to the seal during such installation.

Other objects and advantages of the invention will become apparent during the course of the following description of the accompanying drawings, wherein:

Figure 1 is a central vertical section through a railway freight car axle and roller bearing journal box, according to one form of the invention, taken along the line 1—1 in Figure 2;

Figure 2 is a cross-section taken along the line 2—2 in Figure 1;

Figure 3 is an enlarged fragmentary longitudinal section taken along the line 3—3 in Figure 2;

Figure 4 is an enlarged fragmentary longitudinal section taken along the line 4—4 in Figure 2;

Figure 5 is a cross-section, mainly in end elevation, taken along the line 5—5 through the end cap in Figure 1;

Figure 7:
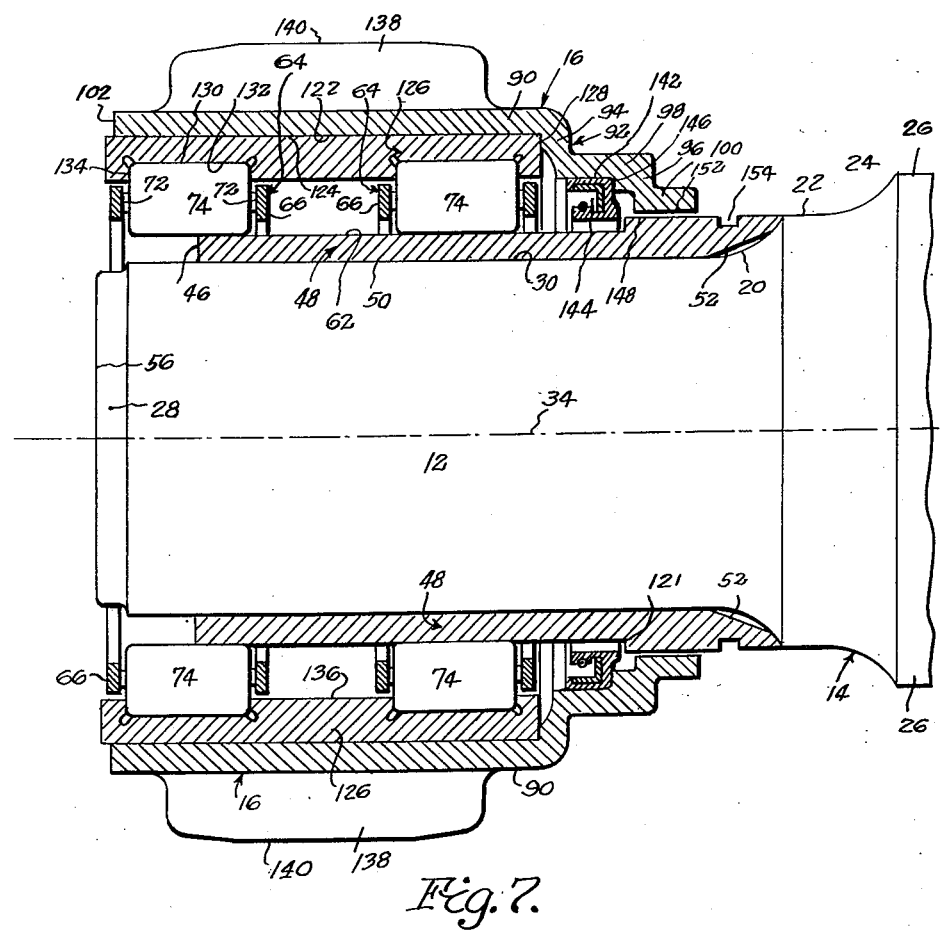

Figure 6 is a top plan view of the roller bearing journal box of Figure 1, mounted on an axle but with its supporting truck side frame omitted; and Figure 7 is a view similar to Figure 1, but showing the relative positions of the parts at an intermediate stage of installation while the journal box containing the seal and outer race with its roller assemblies is being slid onto the inner race, illustrating the self-piloting action thereof.

Hitherto, roller bearing journal boxes have been devised for converting railway car trucks from plain journal bearings to anti-friction journal bearings in order to reduce the starting friction and prevent "hot boxes" (bearing failures). Passenger car roller bearing journal boxes have hitherto been of complicated and expensive construction, involving additional considerations not present in freight car journal boxes, where human beings are not intentionally carried in the freight cars.

Railway freight car axle roller bearing journal boxes hitherto manufactured have also been complicated and expensive, as well as difficult to assemble, install and remove. Certain prior roller bearing journal boxes have formed the outer roller bearing race integral with the housing so that not only is an expensive construction thereby involved, but the entire housing has to be scrapped when wear has occurred. Certain prior journal boxes also have housings which are open at both ends, thereby requiring a separate closure for each end and consequently rendering access difficult to the bolts by which the inner end closure is secured to the main housing. Certain prior roller bearing journal boxes, moreover, have been of complicated construction, with many separate parts which have made them expensive to manufacture, install and maintain.

The roller bearing journal box of the present invention is intended especially for railway freight car axles where low first cost and low maintenance and repair costs are of the utmost importance. The present invention provides a roller bearing journal box which, when mounted in a standard pedestal-type side frame, is interchangeable with standard integral type side frames containing plain bearing journal boxes, so that no special machining or other alterations are required, other than a turning down of the journal portions of the axle to a smaller diameter for conversion of such a truck from plain journal bearings to roller bearings. The present roller bearing journal box is also provided with a one-piece tubular outer race which is separate from the housing thereof, so as to enable its replacement without requiring replacement of the housing as well. The housing of the present roller bearing journal box is closed at one end around the axle, thereby eliminating the necessity for closures at both ends, avoiding the inaccessibility of the bolts with which inner or rear end closures of such housings have been hitherto provided, and enabling the journal box to be installed from the outer end without requiring access to the inner end thereof. The present roller bearing journal box housing, moreover, is symmetrical and is therefore reversible so as to present a new set of pads to the side frame in which it is mounted, as well as presenting a new wear surface of the outer race to the rotors. The present roller bearing journal box permits a limited amount of necessary end play with the end thrust transmitted diagonally from the inner race through the rollers in either of the two rows of bearings to shoulders on the outer race. It also has such a construction of rollers and retainers that individual rollers cannot drop out of the roller assembly during installation or removal of the journal box from the axle.

Referring to the drawings in detail, Figures 1 and 2 show a railway car axle roller bearing journal box, generally designated 10, as installed upon the journal or end portion 12 of a standard railway freight car roller bearing axle 14 and having a housing 16 with paired parallel guide ribs 18 on opposite sides thereof for engagement with the parallel guideways of the fork of a standard pedestal-type side frame (not shown) of a railway freight car truck (not shown). The journal portion 12 of the axle 14 at its rearward end is provided with an annular curved portion 20 leading to an enlarged diameter portion 22 which in turn is provided with another annular curved portion 24, which in turn leads to a still larger diameter portion 26 (Figure 1) on which the car wheel (not shown) is mounted. The outer end portion 28 of the journal portion 12 is of reduced diameter relatively to the cylindrical journal surface 30 on which the roller bearing journal box 10 is mounted, in the manner described below.

The end portion 28 of the axle 14 is also provided with several drilled and threaded holes 32, three being shown in Figure 5, arranged parallel to the axis 34 of the axle 14 and adapted to receive bolts or cap screws 36 which also pass through correspondingly aligned holes 38 in a cup-shaped inner race retainer or end thrust cap 40 thereby bolted to the axle 14 and having a cylindrical bore 42 receiving the journal portion 12 thereof (Figure 1). The retainer 40 has an annular end shoulder 44 which engages the outer end 46 of the tubular or hollow cylindrical sleeve 48 forming the inner race of the roller bearing journal box 10. The inner race 48 has an inner surface 50 receiving the cylindrical outer surface 30 of the axle journal portion 12 with a shrink fit, and at its rearward end has a rounded outwardly flared end portion 52 engaging the rounded annular portion 20 of the axle 14. The recess 54 in the retainer 40 has a depth greater than the distance from the end 46 of the inner race 48 to the end 56 of the axle 14, so as to provide a clearance 58 between the outer end 56 and the bottom 60 of the recess 54 to provide a takeup by means of the cap screws 36 (Figure 1).

Mounted on the cylindrical outer surface or load-carrying surface 62 of the inner race 48 are two axially-spaced straight roller bearing assemblies 64 of the same design and construction. Each roller bearing assembly 64 consists of a pair of annular roller retainers 66 (Figures 1 to 4 inclusive) having circumferentially-spaced projections or lugs 68 extending inwardly toward one another into recesses 70 located in the ends 72 of straight anti-friction bearing rollers 74 having cylindrical load-carrying surfaces 76 thereon (Figure 3). The projections or lugs 68 are preferably formed by striking them outward from the main portion of each retainer 66 by a suitable punch and die, leaving a hollow 78 on the outer side thereof. The lugs 68 and consequently the rollers 74 are spaced at substantially equal intervals around the retainers 66, leaving intervening spaces wide enough to receive the pins or rods 80 having reduced diameter ends 82 (Figure 4) enlarged as at 84 to enter and become locked in correspondingly-located holes 86 with flared outer ends 88 in the retainers 66. By this construction the individual rollers 74 cannot fall out of their assemblies 64 accidentally or inadvertently, as has been a disadvantage of certain prior railway car roller bearing journal boxes. The rollers 74 during manufacture are selected by careful inspection to be of substantially the same diameters and lengths within narrow limits, so that when radial loads or end thrust loads are applied to the rollers, the rollers will all bear their proportionate share of such loads.

The housing 16 is in the form of a generally hollow cube with a side wall or side portion 90 and an inner or rearward end portion 92 consisting of radial portions 94 and 96 interconnected by axial portions 98 and 100 (Figure 1). The outer end face 102 of the housing 16 is machined substantially flat to receive a gasket 104, the opposite side of which is engaged by the face 108 of a closure cap or cover 110 having a dome-shaped central portion 112 extending outwardly from a flanged portion 114 carrying the face 108 and drilled with spaced holes 116 (Figure 2) to receive bolts or cap screws 118 threaded into correspondingly threaded holes 120 in the housing 16. The inner race bearing surface 62 terminates in an annular abutment shoulder 121 with an end-play clearance 123 between the latter and the adjacent roller bearing assembly 64.

The side portion 90 of the housing 16 is provided with a cylindrical bore 122 adapted to slidably receive the outer cylindrical surface 124 of an outer bearing race, generally designated 126, and has an annular end shoulder 128 against which the outer race 126 abuts (Figure 1). The outer race 126 is slightly longer axially than the bore 122 in which it is mounted, so as to be engaged directly by the contact face 108 of the closure cap or cover 110. The outer race 126 is provided with spaced parallel cylindrical grooves 130 with roller path surfaces 132 at the bottom of such grooves and with opposite annular end shoulders 134 engageable with the opposite ends 72 of the bearing rollers 74 so as to transmit thrust therebetween while leaving a sufficient running clearance therebetween. The inner surface 136 of the outer race 126 is preferably cylindrical but is not a running surface engaged by the rollers 74.

The housing side portion 90 on the top and bottom thereof is provided with longitudinally-elongated spaced parallel abutment pads or bosses 138 with abutment surfaces 140 adapted to engage corresponding abutment surfaces in the fork of the pedestal type side frame of a railway car truck (not shown). The bosses 138 contain bores or sockets 141 for receiving a hot box warning device (not shown). The heads of the bolts or cap screws 36 and also the bolts or cap screws 118 are drilled transversely to receive the usual lock wire (not shown) to prevent accidental rotation and consequent loosening during operation. The reduced diameter portion 98 of the end portion 92 of the housing 16 is provided with a cylindrical counterbore 142 of smaller diameter than the retainer-receiving bore 122 and adapted to receive the corresponding cylindrical outer surface of a conventional lubricant-retaining seal 144 which abuts an annular shoulder 146 and has a cylindrical inner surface engaging the outer cylindrical surface 148 near the rearward end of the inner race 48. A clearance space 150 (Figure 1) is provided between the cylindrical inner surface 152 of the reduced diameter portion 100 and the outer surface 148 of the inner race 48, said outer surface 148 being provided with an annular water-intercepting groove 154, which is also used as a pulling groove when removing the inner race 48 from the axle.

In the conversion of a railway car truck to roller bearings according to the present invention, the integral side frames containing the standard bearing journal boxes are first removed from the truck and replaced by a pedestal-type truck side frame (not shown), which has been standardized for roller bearing conversion. The use of the journal box 10 of the present invention is not limited to conversions of existing equipment, but is equally useful for original installation at the time of construction of the equipment. The journal portion 12 of the axle 14 is then turned down to a standardized reduced diameter to receive the inner race 48 of the roller bearing journal box 10. The inner race 48 is then uniformly heated to approximately 300° F. in an oil bath or by induction heating so that it can then be slipped over the journal portion 12 of the axle 14 until its rounded portion 52 engages the correspondingly rounded portion or fillet 20 of the axle 14. The inner race 48 is then allowed to cool, causing its inner surface 50 to tightly grip the outer surface 30 of the journal portion 12 with a shrinkage grip. A similar procedure is followed in fitting the journal box 10 to the axles of new railway cars during their original construction.

In assembling the parts of the journal box 10, the lubricant-retaining seal 144 is inserted in its counterbore 142 followed by the outer race 126 with its roller assemblies 64. Before mounting the journal box 10 on the axle 14, a suitable lubricating grease is applied to the bearing by "buttering" it on and between the rollers 74 as well as on the lips of the seal 144. The journal box 10 is also provided with a lubricating fitting (not shown) and a vent whereby additional grease can be inserted during use. The journal box 10, containing the seal 144 and outer race 126 with the spaced pair of roller assemblies 64, is now slid carefully upon the outer cylindrical surface 62 of the inner race 48 (Figure 7). In so doing, the pair of roller assemblies 64 reach and engage the inner race surface 62 before the lubricant seal 144 reaches the inner race surface 148, thereby piloting the lubricant seal 144 into position onto the inner race surface 148 and thus preventing damage to the seal 144 during such installation. The thrust cap 40 is then applied to the end of the axle journal portion 12 and secured in position by the cap screws 36, which are then wired in position in the usual manner. The closure cap or cover 110 is then applied after installing the cover gasket 104 on the outer surface 122 of the outer race 126, inserting the cap screws 118 through their respective bolt holes 116 and threading them into the threaded holes 120 in the housing 16. The cap screws 118 are then also wired in position to prevent accidental loosening, the roller bearing journal box 10 is then supplied with additional lubricating grease through the lubricating fitting (not shown), whereupon the journal box 10 is ready for use.

To remove the juornal box 10, the foregoing procedure is reversed, and hence requires no additional description. It will be observed, however, that access is required to the front end only of the journal box 10, since the rearward or inner end 92 is closed by a wall integral with the side portion 90 of the housing 16. Accordingly, no rearward bolts or rearward end closure requiring inspection or removal is present, as in certain prior roller bearing journal boxes.

While the foregoing description, for purposes of example, has been applied to the conversion of existing railway car trucks with integral side frames and standard bearing journal boxes to pedestal side frames with roller bearings, it will also be evident that the present invention is equally well adapted for installation as original equipment in railway car trucks when they are first manufactured, in which case the proper pedestal type side frames are installed at the outset and consequently no replacement of existing side frames is involved as in the case of converting existing railway car trucks to roller bearings. In either case, it will be seen that installation of the assembly of the journal box 10, seal 144, outer race 126 and roller assemblies 64 is greatly simplified in the present invention and damage to the seal 144 prevented because of the self-piloting action shown in Figure 7, wherein the rollers 74 of the spaced roller assemblies 64 engage the load-carrying surface 62 of the inner race 48 before the seal 144 reaches its cylindrical seat 148, so that the seal 144 is thereby held firmly and precisely centralized during installation as well as in actual operation.

What we claim is:

1. A roller bearing journal box for installation in the side frame of a railway car truck, comprising a hollow housing having a side wall adapted to fit said side frame and having an open front and a rear end wall integral with said side wall, said end wall extending inwardly into close proximity to the truck axle, said housing side wall having therein a bore closed by said end wall, a hollow cylindrical outer roller bearing race seated in said bore, a hollow cylindrical inner roller bearing race mounted on said truck axle in radially-spaced relationship to said outer race, means for retaining said races in their mounted positions, a plurality of axially-spaced roller bearing assemblies disposed between said races in rolling engagement therewith, and an outer end closure member secured to the open end of said housing, said outer race having axially-spaced recessed annular roller paths therein receiving the rollers of said assemblies; each of said assemblies including a roller retaining structure, bearing rollers disposed in said structure in circumferentially-spaced relationship, and roller detents in said structure engaging and holding said rollers in said structure and recessed roller path whereby to enable insertion and withdrawal of said outer race and roller assemblies as a unit without the dropping out of any rollers.

2. A roller bearing journal box for installation in the side frame of a railway car truck, comprising a hollow housing having a side wall adapted to fit said side frame and having an open front and a rear end wall integral with said side wall, said end wall extending inwardly into close proximity to the truck axle, said housing side wall having therein a bore closed by said end wall, a hollow cylindrical outer roller bearing race seated in said bore, a hollow cylindrical inner roller bearing race mounted on said truck axle in radially-spaced relationship to said outer race, means for retaining said races in their mounted positions, a plurality of axially-spaced roller bearing assemblies disposed between said races in rolling engagement therewith, and an outer end closure member secured to the open end of said housing, said outer race having axially-spaced recessed annular roller paths therein receiving the rollers of said assemblies; each of said assemblies including a pair of spaced annular roller retainers, bearing rollers disposed between said retainers, means interconnecting said retainers, and means holding said rollers in retained engagement with said retainers whereby to enable insertion and withdrawal of said outer race and roller assemblies as a unit without the dropping out of any rollers.

3. A roller bearing journal box for installation in the side frame of a railway car truck, comprising a hollow housing having a side wall adapted to fit said side frame and having an open front and a rear end wall integral with said side wall, said end wall extending inwardly into close proximity to the truck axle, said housing side wall having therein a bore closed by said end wall, a hollow cylindrical outer roller bearing race seated in said bore, a hollow cylindrical inner roller bearing race mounted on said truck axle in radially-spaced relationship to said outer race, means for retaining said races in their mounted positions, a plurality of axially-spaced roller bearing assemblies disposed between said races in rolling engagement therewith, and an outer end closure member secured to the open end of said housing, said outer race having axially-spaced recessed annular roller paths therein receiving the rollers of said assemblies; each of said assemblies including a pair of spaced annular roller retainers, bearing rollers disposed between said retainers, and means interconnecting said retainers, said retainers having pairs of projections thereon extending coaxially toward one another and said rollers having end recesses receiving said projections whereby to enable insertion and withdrawal of said outer race and roller assemblies as a unit without the dropping out of any rollers.

4. A roller bearing journal box for installation in the side frame of a railway car truck, comprising a hollow housing having a side wall adapted to fit said side frame and having an open front and a rear end wall integral with said side wall, said end wall extending inwardly into close proximity to the truck axle and having an annular recess therein, an annular lubricant-sealing element seated in said recess in sealing engagement with said axle, said housing side wall having therein a bore closed by said end wall, a hollow cylindrical outer roller bearing race seated in said bore, a hollow cylindrical inner roller bearing race mounted on said truck axle in radially-spaced relationship to said outer race, means for retaining said races in their mounted positions, a plurality of axially-spaced roller bearing assemblies disposed between said races in rolling engagement therewith, and an outer end closure member secured to the open end of said housing, said outer race having axially-spaced recessed annular paths therein receiving the rollers of said assemblies; each of said assemblies including a roller retaining structure, bearing rollers disposed in said structure in circumferentially-spaced relationship, and roller detents in said structure engaging and holding said rollers in said structure and recessed roller path whereby to enable insertion and withdrawal of said outer race and roller assemblies as a unit without the dropping out of any rollers.

5. A roller bearing journal box for installation in the side frame of a railway car truck, comprising a hollow housing having a side wall adapted to fit said side frame and having an open front and a rear end wall integral with said side wall, said end wall extending inwardly into close proximity to the truck axle and having an annular recess therein, an annular lubricant-sealing element seated in said recess in sealing engagement with said axle, said housing side wall having therein a bore closed by said end wall, a hollow cylindrical outer roller bearing race seated in said bore, a hollow cylindrical inner roller bearing race mounted on said truck axle in radially-spaced relationship to said outer race, means for retaining said races in their mounted positions, a plurality of axially-spaced roller bearing assemblies disposed between said races in rolling engagement therewith, and an outer end closure member secured to the open end of said housing, said inner race including an annular enlarged diameter portion on the rearward end thereof engageable with the inner surface of said lubricant sealing element.

References Cited in the file of this patent

UNITED STATES PATENTS

| Re. 12,498 | Lawson | June 26, 1906 |
| 1,064,863 | Sharpneck | June 17, 1913 |
| 1,521,974 | Stafford | Jan. 6, 1925 |
| 1,723,764 | Carroll | Aug. 6, 1929 |
| 2,176,244 | Brittain | Oct. 17, 1939 |
| 2,744,474 | Reynolds | May 8, 1956 |

FOREIGN PATENTS

| 574,297 | Great Britain | Dec. 31, 1945 |
| 881,209 | Germany | June 29, 1953 |